United States Patent

[11] 3,614,647

[72] Inventor Harold Seidel
Warren, N.J.

[21] Appl. No. 874,001
[22] Filed Nov. 4, 1969
[45] Patented Oct. 19, 1971
[73] Assignee Bell Telephone Laboratories, Incorporated
Murray Hill, Berkeley Heights, N.J.

[54] GENERALIZED IMPEDANCE-MATCHED MULTIBRANCH ARRAY
6 Claims, 4 Drawing Figs.

[52] U.S. Cl. .......... 330/124, 330/124
[51] Int. Cl. .......... H03f 3/68
[50] Field of Search .......... 330/53, 124; 333/8, 11

[56] References Cited

UNITED STATES PATENTS

| | | | |
|---|---|---|---|
| 2,531,447 | 11/1950 | Lewis .......... | 333/11 |
| 3,252,113 | 5/1966 | Veltrop .......... | 333/11 X |
| 3,423,688 | 1/1969 | Seidel .......... | 330/124 X |

OTHER REFERENCES

Lee; H. C., " Microwave Power Transistors," The Microwave Journal, pp. 63, 64, Feb. 1969

*Primary Examiner*—Roy Lake
*Assistant Examiner*—Lawrence J. Dahl
*Attorneys*—R. J. Guenther and Arthur J. Torsiglieri

ABSTRACT: A multibranch array comprising a multibranch input network for dividing a signal into $n$ equal signal components, where $n$ is any integer, and a multibranch output network for recombining said components in phase. The networks are interconnected by means of $n$ branch circuits which include first phase shifters for producing phase differences among the branch signals equal to different multiples of 180 $m/n$°, where $m$ is an integer less than $n$. Second phase shifters produce complementary phase shifts to restore the signals to a common phase for recombination in the output network. Amplifiers or other circuit elements are located in each of the branch circuits between pairs of phase shifters.

PATENTED OCT 19 1971 3,614,647

SHEET 1 OF 2

INVENTOR
H. SEIDEL
BY
Sylvan Sherman
ATTORNEY (PRIOR ART BROADBAND MULTIBRANCH NETWORK)

GENERALIZED IMPEDANCE-MATCHED MULTIBRANCH ARRAY

This invention relates to nonbinary, multibranch circuits.

BACKGROUND OF THE INVENTION

Until very recently, the utilization of many solid-state active circuit components, such as transistors and tunnel diodes, for example, has been limited to relatively low power applications. This was due to the low power handling capability of such devices and their relatively high cost which discouraged their use in large numbers as a means of overcoming their limited power handling capacity. Recently, however, there has been a substantial reduction in the cost of many solid-state devices which, in turn, now makes it commercially feasible to use them in relatively large numbers.

The technical problems associated with operating large numbers of active elements in a parallel array are problems of synchronization and stabilization. Stating the problem briefly, the many independent active elements must be synchronized so as to cooperate in a manner to produce maximum output power for the desired mode of operation, while, at the same time, the active elements must be incapable of cooperating at all other possible modes of operation. The suppression of spurious modes must be insured both without the frequency range of interest as well as within the frequency range of interest, thus insuring unconditional stable operation.

In U.S. Pat. Nos. 3,423,688 and 3,444,475 the problems of synchronization and stabilization are conveniently resolved by means of a hybrid-coupled fan-out array which divides the input signal equally among $2^m$ branch circuits. Such an arrangement, however, is limited to binary systems and suggests no means for extending its teachings to nonbinary systems.

U.S. Pat. No. 3,394,318 discloses a multibranch parallel which is capable of operating with any arbitrary number of branches. For this arrangement, the preferred mode of operation is in the in-phase mode. As described, however, it does not discriminate against equal mismatches in the parallel branches and hence, equal components of energy, reflected by the amplifiers, are combined by the input network and appear at the input terminal. Thus, equal mismatches in the $n$ branch circuits cause a corresponding mismatch at the input to the array.

It is, accordingly, the broad object of the present invention to isolate the input terminal of a multibranch parallel array, having any arbitrary number of branches, from equal mismatches in the branch circuits.

It will also be noted that in the prior art arrays, spurious harmonics of the signal frequency, generated in the branch circuits, will also be combined in phase by the output network.

It is, accordingly, another object of the invention to suppress spuriously generated harmonic of the signal frequency.

SUMMARY OF THE INVENTION

A multibranch circuit, in accordance with the present invention, comprises an input network having one input branch and $n$ output branches for dividing an input signal into $n$ equal components, where $n$ is any integer. A similar output network, having $n$ input branches and one output branch, recombines the $n$ signal components in phase in the one output branch. In addition, the networks are adapted to pass in-phase signal components, but to match-terminate out-of-phase signal components.

To avoid the limitations of the prior art nonbinary multibranch circuits, the $n$ interconnecting branch circuits include, at their input ends, a first group of phase shifters for introducing relative phase shifts equal to different integral multiples of $180m/n$ degrees among the $n$ branch signals, where $m$ is an integer less than $n$. Following amplification, or other operation upon the branch signals, the latter are restored to a common phase by means of a second group of phase shifters which introduce a complementary phase shift to the branch signals. As such, the branch signals are recombined in-phase in the output branch of the second network. Reflections, however, due to equal mismatches in the $n$ branch circuits, assume an asymmetric phase mode, uniformly distributed over 360°, and thus sum to zero at the source terminal. The reflected energy is, however, accepted without reflection by the input multibranch network and absorbed in suitably provided internal dissipative members. It is, thus, a feature of the invention that equal mismatches in the branch circuits of a multibranch array, having any arbitrary number of branches, are not communicated to the circuit input terminal and, hence, the circuit as a whole appears matched.

This feature of the invention is of particular interest when used as a broadband amplifier since it permits the individual amplifiers, located in the $n$ branches, to be similarly mismatched over the frequency range of interest without adversely affecting the match at the input terminal of the amplifier array.

It is a further feature of the invention that when the relative phases between branch signals differ by different integral multiples of $360/n$ degrees, i.e., $m$=2, the array produces cancellation of all spuriously generated harmonics up to and including the $n^{th}$ harmonic of the signal frequency.

These and other objects and advantages, the nature of the present invention, and its various features, will appear more fully upon consideration of the various illustrative embodiments now to be described in detail in connection with the accompanying drawings.

DETAILED DESCRIPTION

Figure 1:
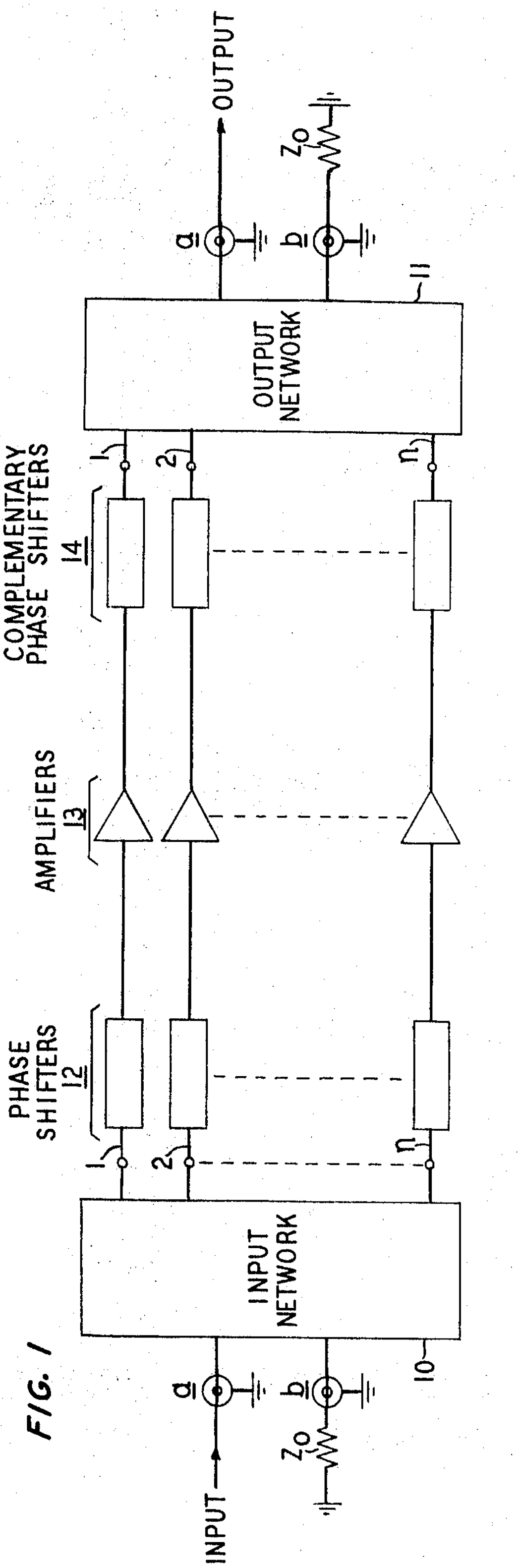
FIG. 1 shows, in block diagram, a multibranch array in accordance with the present invention.

Referring to the drawings, FIG. 1 shows, in block diagram, a multibranch array in accordance with the present invention comprising: a multibranch input network 10 for dividing the input signal among $n$ output branches; a multibranch output network 11 for recombining the $n$ branch signals to form one output signal; and $n$ branch circuits 1, 2,...$n$. connecting the $n$ branches of the input network to the $n$ branches of the output network.

Input network 10 is a power divider capable of dividing an input signal equally among the $n$ output branches. Of particular interest to the present invention, are those networks for which $n$ is a nonbinary integer. In addition, network 10 has the property that out-of-phase signal components coupled to branches 1, 2,...$n$ sum to zero at input branch $a$, while adding constructively at branch $b$, where they are match-terminated by termination $Z_o$. In-phase signal components on the other hand, sum to zero at branch $b$ and add constructively at branch $a$.

Output network 11 is essentially identical to input network 10 and is used to combine in-phase branch signals in output branch $a$. Spurious, out-of-phase branch signals are dissipated in a termination $Z_o$ coupled to branch $b$. It should be noted, however, that the use of a single termination $Z_o$ coupled to a single branch is only symbolic. As will appear more fully hereinbelow, the termination may take different forms.

Branch circuits 1 through $n$ include in cascade: a first group 12 of phase shifters for introducing a relative phase difference between pairs of branch signals that is a different integral multiple of 180 $m/n$ degrees, where $m$ is an integer less than $n$; amplifiers 13, or other apparatus, such as converters, et cetera, for operating upon the branch signals; and a second group of complementary phase shifters 14 for restoring the branch signals to an in-phase state for recombination by output network 11.

Figure 2:
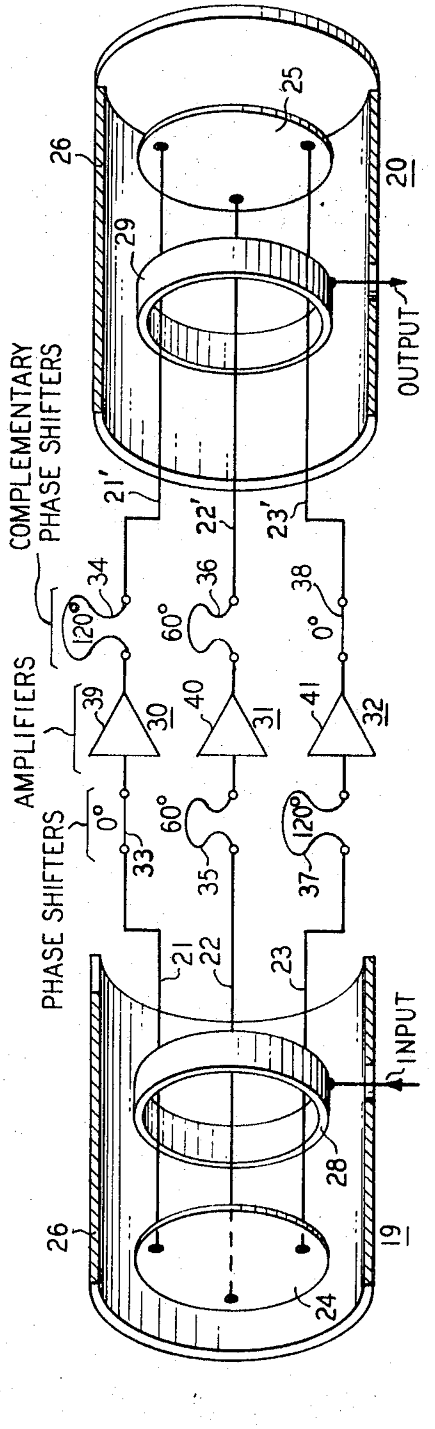
FIG. 2 shows a first specific embodiment of the array of FIG. 1.

FIG. 2 shows a first specific embodiment of the invention intended for narrow band applications. In this embodiment, the input and output multibranch networks 19 and 20 are the type disclosed in U.S. Pat. No. 3,394,318. As described therein, each includes a resistive termination 24, 25 having an impedance $Z_o$ of $\sqrt{\frac{\mu}{\epsilon}}$ ohms per square, where $\pi$ and $\epsilon$ are the permeability and permittivity of the surrounding medium, ($Z_o$=377 ohms per square in air). "Birdcages," or circular arrays of conductors 21, 22, 23 and 21', 22', 23', comprising the network branches, are conductively connected to terminations 24 and 25, respectively. The conductors and the surrounding cylindrical, conductive enclosure 26 form a plurality of uniformly parallel transmission lines which propagate wave energy substantially in the TEM mode. It will be understood that more branch conductors can be used, and that the use of three in FIG. 2 is merely for purposes of illustration.

Signal energy is capacitively coupled into conductors 21, 22 and 23, and out of conductors 21', 22' and 23' by means of circular, low-loss conductive rings 28 and 29. Advantageously, rings 28 and 29 are located immediately adjacent to terminations 24 and 25 or approximately multiples of half a wavelength away, and have a width that is no greater than a quarter of a wavelength at the frequency of interest. The circumference of both rings is, in addition, made small relative to this wavelength so that both coupling rings appear as equipotential surfaces at the operating frequencies.

Each of the branch circuits 30, 31 and 32, connecting the input and output networks, includes, in cascade, a first phase shifter, an amplifier and a second, complementary phase shifter. In a narrow band embodiment, the phase shifters can be different lengths of transmission line. As one example, the phase shifters in branch circuit 30 comprise a first length of transmission line 33 having a reference relative phase shift of 0°, and a second length of transmission line 34 having a relative phase shift of 120°, for a total relative phase shift of 120°. Similarly, the phase shifters in branch circuit 31 comprise a first line 35, having a relative phase shift of 60°, and second line 36 having a relative phase shift of 60° for a total of 120°, while the phase shifters in branch circuit 32 comprise a first line 37, having a relative shift of 120°, and second line 38 having a relative phase shift of 0°.

The branch circuits include, in addition, amplifiers 39, 40 and 41 located between the two sets of complementary phase shifters.

In operation, an input signal applied to ring 28 couples equally to each of the conductors 21, 22 and 23, inducing three, equal and in-phase branch signals. Being in phase, there is no coupling to termination 24, and hence, all the signal energy is coupled out of the input network 19 along the respective branch circuits. The first group of phase shifters introduce a first relative phase shift between different pairs of branch signals that is a different integral multiple of $180m/n$ degrees or, in this case, where $n$=3 and $m$=1, a different integral multiple of 60°. The branch signals are then amplified and coupled into the output network 20 in-phase by virtue of the added, complementary phase shift introduced by the second group of phase shifters. Being in phase again, the signals are coupled out of the output network by means of ring 29, with no energy being dissipated in termination 25.

If amplifiers 39, 40 and 41 are not properly matched to the transmission lines, a component of signal will be reflected by each of the amplifiers back towards input network 19. Since all the amplifiers are the same, the reflections will be equal, producing three reflected signal components that will have propagated through the first group of phase shifters twice. These, therefore, will have relative phases of 0, 120 and 240°. As such, they will sum to zero in ring 28. At termination 24, however, they produce a net voltage between pairs of conductors which results in current flow and power dissipation. In addition, because of the particular magnitude of the termination ohms per square, the lines are match-terminated so that all the reflected energy is absorbed in the termination and none is re-reflected.

Similarly, any out-of-phase signal components produced by distortion in the amplifiers, are absorbed in termination 25.

Thus, the nonbinary array shown in FIG. 2 is capable of transmitting wave energy in only the in-phase mode. In addition, equal mismatches in the respective branch circuits are not communicated to the input terminal but are, instead, internally dissipated in the multibranch input network.

Figure 3:
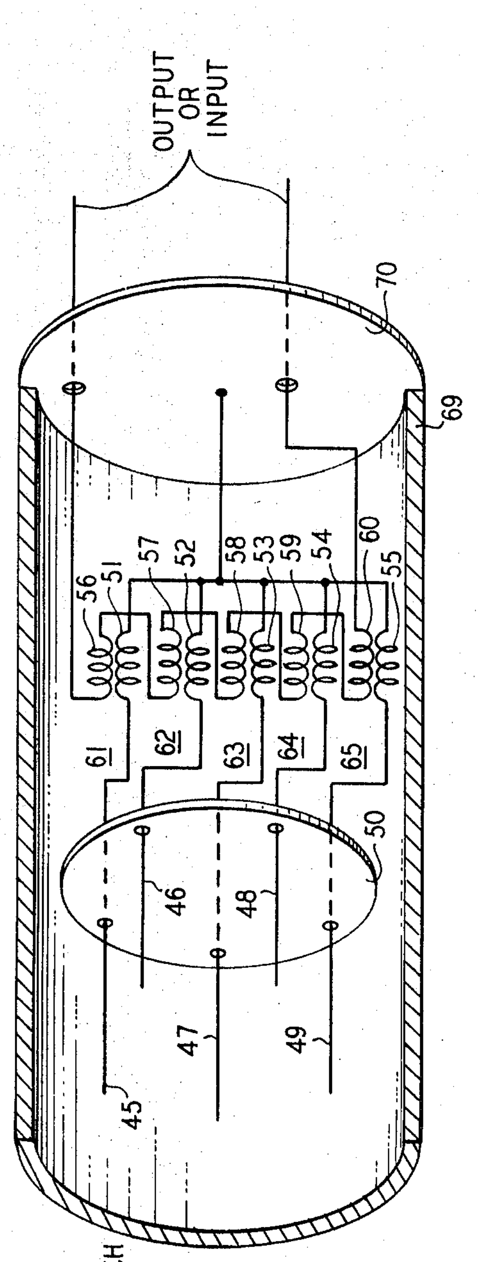
FIG. 3 shows an alternate broadband, multibranch power divider.

FIG. 3, which is also described in U.S. Pat. No. 3,394,318, shows an alternate, broadband multibranch input (and output) network utilizing inductive coupling instead of capacitive coupling. For purposes of illustration, a five branch network is shown, comprising branch conductors 45, 46, 47, 48 and 49; outer conductive cylinder 69; resistive termination card 50; and five substantially identical transformers 61, 62, 63, 64 and 65. The latter are used instead of the ring of FIG. 2 to produce broadband, in-phase coupling.

As in the embodiment of FIG. 2, all the branch conductors 45 through 49 are terminated by resistive card 50. In addition, each conductor is connected to one end of one of the primary windings 51, 52, 53, 54 or 55 of the transformers. The other ends of the primary windings are connected to the outer conductive cylinder 69 by means of an end conductive plate 70.

The transformer secondary windings 56, 57, 58, 59 and 60 are connected series-aiding. External connection to the input (or output) circuit is made across the series-connected secondary windings.

When used as an input circuit, a signal applied across the series-connected secondary windings induces in-phase voltages in the five branch conductors. When used as an output circuit, in-phase voltages on the five branch conductors induce in-phase signal components in the secondary windings which add in time phase to produce the output signal. Out-of-phase voltages, on the other hand, induce opposing voltages in the secondary windings which sum to zero. With respect to the out-of-phase voltages, the transformers appear as open circuits across resistive card 50. Hence, all the power associated with these signal components is dissipated in the resistive termination.

In addition to the changes in the input and output networks, a broadband system requires a broadband phase shifter. One such phase shifter, shown in FIG. 4, comprises in cascade, a 3 db. quadrature hybrid coupler 71; a 180° coupler 72 whose power division ratio is a function of the phase shift desired; and a second 3 db. quadrature coupler 73. The couplers are cascaded such that a pair of conjugate branches of each is coupled to a pair of conjugate branches of the next coupler. Noting that in the so-called "180° coupler" the divided signal components are either in phase or 180° out of phase, depending upon which input port is excited, and that they are always 90° out of phase in the quadrature coupler, the signals at the various coupler ports are given below in Table I when port $a$ of coupler 71 is excited by a unit signal.

TABLE I

| Port | Signal Amplitude and Phase |
|---|---|
| a | 1 |
| c, e | $\frac{1}{\sqrt{2}}$ |
| d, f | $\frac{i}{\sqrt{2}}$ |
| g, j | $\frac{\cos\theta}{\sqrt{2}}-\frac{i\sin\theta}{\sqrt{2}}$ |
| h, k | $\frac{i\cos\theta}{\sqrt{2}}+\frac{\sin\theta}{\sqrt{2}}$ |
| l | $\frac{\cos\theta}{2}-\frac{i\sin\theta}{2}-\frac{\cos\theta}{2}+\frac{i\sin\theta}{2}=0$ |
| m | $\frac{i\cos\theta}{2}+\frac{\sin\theta}{2}+\frac{i\cos\theta}{2}+\frac{\sin\theta}{2}$ $=\sin\theta+i\cos\theta=i\epsilon^{-i\theta}$ |

Thus, a unit signal applied at port $a$ of quadrature hybrid 71, is coupled to port $m$ of hybrid 73 with a relative phase shift $\theta$, to within a constant 90°, which is solely a function of the power division ratio of the 180° hybrid 72. 180° hybrids having arbitrary power division ratios are described in my copending application Ser. No. 869,606 filed Oct. 27, 1969. For a five branch network, one set of values for $\theta$ is given by 0°, 36°, 72°, 108° and 144°.

Figure 4:
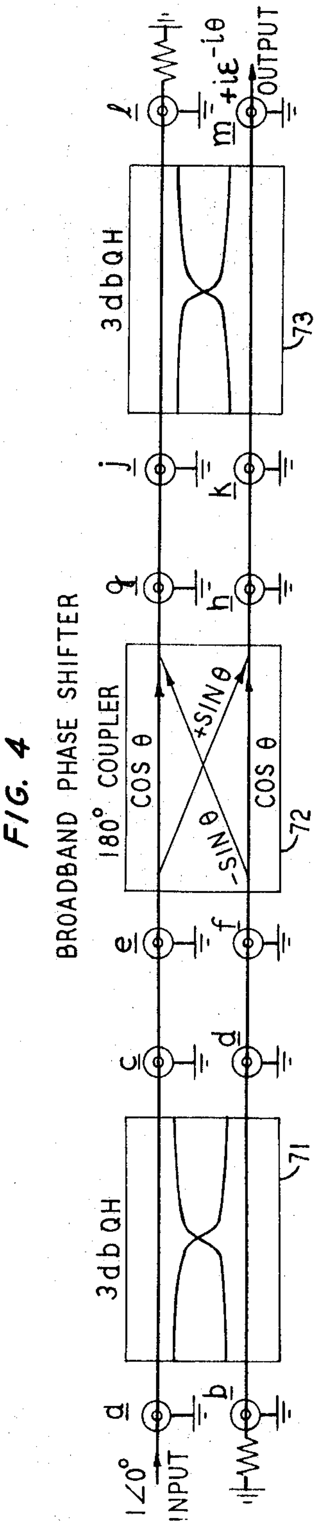
FIG. 4 shows a broadband phase shifter for use with the present invention.

Thus, one example of a broadband system in accordance with the invention would include input and output multibranch networks of the type shown in FIG. 3, and phase shifters of the type shown in FIG. 4.

As indicated hereinabove, it is a feature of the invention that when the relative phase shifts introduced in the branch circuits differ by multiples of $360/n$ degrees, i.e., $m=2$, spuriously generated harmonics of the signal frequency up to and including the $n^{th}$ harmonic, are suppressed by the output network. To illustrate the harmonic suppression feature of the invention, the relative phases of the amplified branch signals and their first $n+1$ harmonics are listed in Table II. Table III shows the signal phases at the output network, i.e., after propagating through the complementary phase shifters.

TABLE II

Branch Signal Relative Phase* at Amplifier Output

| $f_0$ | $2f_0$ | $3f_0$ | $4f_0$ | $5f_0$ | $6f_0$ | $7f_0$ |
|---|---|---|---|---|---|---|
| 0 | 0 | 0 | 0 | 0 | 0 | 0 |
| 60 | 120 | 180 | 240 | 300 | 0 | 60 |
| 120 | 240 | 0 | 120 | 240 | 0 | 120 |
| 180 | 0 | 180 | 0 | 180 | 0 | 180 |
| 240 | 120 | 0 | 240 | 120 | 0 | 240 |
| 300 | 240 | 180 | 120 | 60 | 0 | 300 |

TABLE III

Branch Signal Relative Phase* at Output Network

| $f_0$ | $2f_0$ | $3f_0$ | $4f_0$ | $5f_0$ | $6f_0$ | $7f_0$ |
|---|---|---|---|---|---|---|
| 300 | 300 | 300 | 300 | 300 | 300 | 300 |
| 300 | 0 | 60 | 120 | 180 | 240 | 300 |
| 300 | 60 | 180 | 300 | 60 | 180 | 300 |
| 300 | 120 | 300 | 120 | 300 | 120 | 300 |
| 300 | 180 | 60 | 300 | 180 | 60 | 300 |
| 300 | 240 | 180 | 120 | 60 | 0 | 300 |

*Integral multiples of 360 are subtracted.

It will be noted from Table III that the second through the sixth harmonic branch signals are out of phase at the output network and, as such, sum to zero in the output branch. The fundamental frequency branch signals and the seventh harmonic branch signals, on the other hand, are in phase and, therefore, sum constructively in the output branch. Thus, in addition to maintaining a match at the array input branch, a multibranch array in accordance with the present invention has the ability to cancel spuriously generated harmonics up to and including the $n^{th}$ harmonic and, thereby, to produce an output signal having very low harmonic distortion. It is, of course, understood that the above-described cancellation presupposes that the array is sufficiently broadband to maintain the necessary phase integrity over the frequency range of interest.

It will be understood that the above-described arrangements are illustrative of but a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. In combination:

an input network having one input branch and $n$ output branches for dividing an input signal, coupled to said input branch, into $n$ equal in-phase input signal components in said $n$ output branches, where $n$ is any integer greater than two;

an output network having $n$ input discloses and one output branch for recombining said $n$ signal components in phase in said one output branch;

said networks having a low loss to in-phase signal components and being match-terminated for out-of-phase signal components;

and $n$ branch circuits for connecting the respective branches of said input and output networks; characterized in that said branch circuits include:

a first group of phase shifters for producing a relative phase shift between pairs of said input signal components equal to different integral multiples of $180m/n$ degrees, where $m$ is an integer less than $n$;

and a second group of phase shifters for producing an in-phase relationship among the $n$ signal components coupled to said output network.

2. The combination according to claim 1 wherein said phase shifters comprise, in cascade:

a first 3 db. quadrature hybrid coupler;

a 180° hybrid coupler having an arbitrary power division ratio;

and a second 3 db. quadrature hybrid coupler;

said couplers being connected such that a pair of conjugate branches of each is connected to a pair of conjugate branches of the next adjacent coupler.

3. The combination according to claim 1 including means for operating upon said signal components included in each of said branch circuits between said first and second phase shifters.

4. The combination according to claim 1 including an amplifier in each of said branch circuits between said first and second phase shifters.

5. The combination according to claim 1 wherein $m=2$.

6. A broadband phase shifter comprising, in cascade;

a first 3 db. quadrature hybrid coupler;

a 180° hybrid coupler having an arbitrary power division ratio;

and a second 3 db. quadrature hybrid coupler;

said couplers, each of which has two pair of conjugate ports, being connected such that one pair of conjugate ports of each of said quadrature couplers is connected to a different pair of conjugate ports of said 180° coupler;

one port of the other pair of conjugate ports of the first of said quadrature couplers being the input port of said phase shifter and one port of the other pair of conjugate ports of the second of said quadrature couplers being the output port of said phase shifter.